UNITED STATES PATENT OFFICE 2,194,777

CEMENT

Waldo E. Tyler and Thomas B. Douglas, Kansas City, Mo., and Paul R. Chamberlain and Russ A. Loveland, Dewey, Okla., assignors to Dewey Portland Cement Company, Kansas City, Mo., a corporation of West Virginia No Drawing. Application January 10, 1935, Serial No. 1,154

3 Claims. (Cl. 106—27)

This invention relates to a cement, the composition of which is such as to render it particularly satisfactory for the making of mortar for masonry and other wall constructions and coatings.

It has heretofore been proposed to use numerous oily, fatty and resinous substances, or compounds or mixtures thereof, for the purpose of increasing the plasticity or waterproofness of cement mixtures. In particular, it has been proposed in the Schoellkopf Patent No. 930,697 to waterproof cement by incorporating into the cement forming material a lime salt of rosin, presumably chiefly lime or calcium resinate. Other prior art patents, such as the Liebolt Patent No. 847,015, disclose the use of the reaction product of stearin, rosin and potash for this purpose.

Further, the Lundteigen Patent No. 1,923,383 discloses the use of a small quantity of a resinous material for the purpose of aiding in the grinding of the cement clinkers. However, the quantity of resinous material for this purpose is much less than that which would be necessary to impart the degree of plasticity and workability desired in our product.

It has also been proposed in the Starke Patent No. 1,947,504 to grind cementitious material, in which has been incorporated an inert material other than Portland cement and an oleaginous material, to obtain a cement having a very fine particle size with a relatively large proportion of particles of an intermediate size.

According to the present invention, a cement of extreme fineness of particle size and having desirable properties, such as its plasticity, stiffening time and water retentiveness, is obtained by incorporating into Portland cement clinkers and grinding therewith a substantial proportion of a calcareous substance, such as limestone, a small proportion of gypsum and anhydrite and a very minor proportion of a mixture of a resinous substance and a fatty, or oily substance. We have found that a composition of this type when made in accordance with our invention is peculiarly adapted for use as a mason's cement and that it possesses properties for this purpose that are not possessed by the cementitious compositions of the prior art.

While incidentally the incorporation of the mixture of resinous and oily substances, which, for convenience, is referred to as a plasticizer, aids in the grinding of the cementitious materials, the main purpose in the addition of the plasticizer is to increase the workability and plasticity of the mortar and to increase its stiffening time. For this purpose we have found that an admixture of a resin and an oily or fatty substance is more satisfactory, both from the standpoint of cost and also from the standpoint of the desirability of the properties imparted to the finished product, than is the incorporation of either a resin or a fatty substance by itself. We have further found that for this purpose over 0.25% by weight of plasticizer on the dry weight of cement forming materials must be used. This proportion is several times that of rosin necessary by itself to provide satisfactory grinding conditions.

It is therefore an object of this invention to provide a composition of cement forming material containing a mixture of a resin and a fatty or oily substance in such proportions as to impart a high degree of plasticity and workability to the mortar into which the cement forming materials may be incorporated.

It is a further important object of this invention to provide an improved cement of the Portland cement type having a high sand carrying capacity and capable of forming a mortar which when hardened and dried is of relatively low density yet water impervious.

It is also an object of this invention to provide a mason's cement of the Portland cement type which maintains its plasticity for a much greater length of time after having been worked up than the usual Portland cements, and hence does not require remixing or retempering to maintain it in proper condition for use, with consequent saving in labor and expense, and elimination of loss of time which would ordinarily occur in remixing or retempering.

It is a further important object of this invention to provide a cement of extreme fineness of particle size and with a plasticizer incorporated therein, whereby the composition of the cement is such that it has highly desirable properties peculiarly adapting it for use as a mason's cement, such as its plasticity, stiffening time and water retentiveness.

Other and further important objects of this invention will become apparent from the following description and appended claims.

The cement forming materials that are used in the preparation of a composition of our invention comprise various mixtures of burned argillaceous and calcareous substances, and more particularly Portland cement clinkers, with raw limestone and gypsum, or plaster of Paris, and anhydrite. By the term "anhydrite" is meant a naturally occurring anhydrous calcium sulphate or an artificially prepared insoluble form of anhydrous calcium sulphate.

In general, we prefer to employ about 50% of Portland cement clinkers, about 46.8% of raw limestone rock, a small percentage, say 1.6% of gypsum, and 1.6% of anhydrite, all expressed as percentages by weight of the finished mixture.

It is obvious that a lower ratio of Portland cement clinkers to limestone can be employed, or a higher ratio, but with a lower ratio there is a corresponding sacrifice in the strength of the mortar and with a higher ratio, the cost of the finished product is increased. For some purposes, however, such as where higher strength is required, the Portland cement content of our product may be run up to practically 100%.

We prefer to keep the percentage of Portland cement clinkers by weight between the rather narrow limits of 48% to 60% and vary the percentage of raw limestone rock correspondingly. The percentage of gypsum may be varied, as may also be the percentage of anhydrite, but sufficient amounts of gypsum and anhydrite, preferably in equal proportions by weight, are incorporated into our cement to produce a product having a total $SO_3$ content between 3.0 and 3.5% by weight of the Portland cement clinker content, and in any event above 1%. In order to obtain the desired properties in our mason's cement, the incorporation of both gypsum and anhydrite is essential, although obviously either one or both may be omitted with consequent loss of the advantages that accrue from their use. The function of the anhydrite is to supply $SO_4$ ions after the $SO_4$ ions introduced as gypsum have been consumed in the formation of calcium sulphoaluminate. The entire quantity of $SO_4$ ions required can not be introduced as gypsum because this quantity of gypsum would be sufficient to reduce the stiffening time owing to the setting of the gypsum which becomes more or less dehydrated during the process of manufacturing.

The raw (unburned) limestone may be either a high grade of limestone, i. e., principally calcium carbonate, or it may contain some naturally associated clay, or silicate; or minor proportions of clay or silica may be added to the high grade limestone. The presence of a little clay adds to the plasticity of the product. Any inert equivalent calcareous substance may be substituted for the limestone, such as oyster shells, chalk, or the like. Sand by itself is not an equivalent of raw limestone, although it may be added with limestone to replace a small proportion of the limestone, say up to 10 or 20% of the weight of the limestone.

The gypsum, or an equivalent retarding agent, is necessary to give the proper setting qualities to the mortar. Although other forms of calcium sulphate, such as plaster of Paris, would be satisfactory as a substitute for gypsum, plaster of Paris is, in general, too expensive to use. Gypsum is not, however, the full equivalent of anhydrite, but both must be used in order to get the best results.

The term "Portland cement clinkers" is here used in its accepted sense as defining a partially fused product made from argillaceous and calcareous materials by a sintering or calcining operation. It may, for instance, be made by sintering together a mixture of, say, 75% or more of limestone and the balance clay or shale. Any suitable type of raw mix known to the art for producing Portland cement clinkers can be employed.

In making up our plasticizer, we prefer to mix ordinary wood rosin, as the resinous substance, with yellow hog fat grease as the fatty or oily component. While other types of rosin, such as gum rosin, or other resin capable of forming insoluble lime salts may be employed, wood rosin is preferable both because of its cheapness and its availability. The usual grades of crude wood rosin, such as grade B resin or grade F rosin, are satisfactory for our purposes.

Similarly, other types of grease or fatty substances may be used, as for instance lard or other refined hog fat, but the use of the more refined fats is objectionably expensive. Yellow hog fat grease can not be successfully used by itself in quantities necessary to give the desired results, because it makes the material being handled adhere to the spouts, bins, wall, and feeders. Yellow hog fat grease contains a large percentage of oleic acid and oleates, the combined percentage of oleic acid and the glycerides of oleic acid in yellow hog fat grease being approximately 50% of the total weight of the grease.

The effect of varying the percentage of yellow hog fat grease and rosin in a mixture of the two upon the plasticity of the final product has been fully studied and it has been determined that, starting with a 100% of rosin as the plasticizer, the plasticity of the final cement increases very rapidly with the addition of yellow hog fat grease to the rosin, until a mixture of approximately 60% rosin and 40% yellow hog fat grease is reached, after which no further increase in plasticity is realized by increasing the proportion of yellow hog fat grease. For all practical purposes, the addition of 5% of yellow hog fat grease to rosin, thus forming a mixture of 95% rosin and 5% of yellow hog fat grease, is entirely satisfactory. The plasticity obtained by using a mixture of 95% rosin and 5% yellow hog fat grease is almost twice as good as that using rosin alone and about 20% better than that obtained by the use of yellow hog fat grease alone.

Thus, although it is possible to secure some advantages by the use of either rosin alone or yellow hog fat grease alone, an unexpected advantage is secured by the use of a mixture of these two ingredients in proportions of between 5 and 80% by weight of yellow hog fat grease, with the rosin making up the balance, and a mixture, specifically, of 95% rosin and 5% yellow hog fat grease is most economical and satisfactory for our purposes. The two ingredients should be mixed together at a temperature sufficiently high so that all of the ingredients will be melted and an intimate mixture obtained. A temperature of between 250 and 300° F., preferably 250° F., will ordinarily be sufficient to accomplish this.

It has been found necessary, in order to impart the requisite degree of plasticity and workability to the mortar into which the mason's cement is to be made, to incorporate over 0.3% of the rosin and yellow hog fat greases by weight of the dry mixture of cement forming materials. Expressed differently, we find that in order to secure the results desired, it is impractical to use less than one pound of the rosin-fat mixture to a barrel of the finished cement forming materials, weighing 268 pounds. This figures out to be about 0.37% of the rosin-fat mixture by weight of the total cement mixture. While it is possible to increase the amount of the rosin-fat mixture to a percentage above 3%, further additions of the mixture beyond that percentage do not result in any appreciable added plasticity or workability and tend to lessen the strength of the mortar, as well as to increase the cost of making the same.

The incorporation of the plasticizer into the cement forming materials is preferably carried out during the grinding of the Portland cement clinkers. In a triple stage grinding operation, using a roller type and two tube mills, the plasticizer is added to the gypsum and the mixture introduced into the stream of clinkers, which may be still warm, but not sufficiently hot to decompose the plasticizer. The addition of the plasticizer may be made either prior to grinding in the first mill or subsequent thereto. The anhydrite may be added at the same time, or the rosin-fat mixture may be incorporated into a mixture of the gypsum and anhydrite. Preferably, a mixture of gypsum and plasticizer is introduced into the stream of clinkers at the same time that the raw limestone is, and the resulting mixture conveyed into the first mill and thence into the second and third mills.

Preferably, no free lime as such is present in my cement, although upon use of the cement with water approximately 7% of calcium oxide is liberated.

The grinding operation, which is carried out at a temperature of about 250° F., serves to completely and thoroughly mix the rosin, hog fat grease and other ingredients. As previously stated, the proportions of gypsum, anhydrite and limestone rock may be varied through a considerable range, but best results have been obtained by varying the proportions of gypsum and anhydrite through a narrow range only, and in accordance with the percentage of sulphur trioxide ($SO_3$) in the gypsum and anhydrite so as to maintain the total percent of sulphur trioxide radical ($SO_3$) at between 3.0 and 3.5% by weight of the Portland cement clinker content (dry). If sufficient gypsum alone were added to obtain the relatively high $SO_3$ content of our cement, the mortar made therefrom would set too quickly. The use of a relatively insoluble anhydrous calcium sulphate, such as anhydrite, permits the use of a relatively high percentage of $SO_3$ to obtain the accompanying increase in strength without sacrifice of the stiffening time. Anhydrite is sufficiently soluble in the mortar mix to furnish, with the gypsum, enough Ca and $SO_4$ ions to form with the alumina compounds contained in the clinker a calcium sulpho-aluminate.

The cementitious mixture is ground in the mills to a fineness preferably such that about 98% by weight of the mixture passes through a 325 mesh screen. A typical sample of our mason's cement shows the following degree of fineness, expressed in terms of the mesh through which the product will pass and also in terms of diameters of particles expressed in microns, as determined by means of a Wagner turbidimeter:

|  | Per cent by weight |
|---|---|
| Pass 325 mesh | 99.2 |
| Less than 35 microns | 99.2 |
| Less than 30 microns | 97.6 |
| Less than 25 microns | 95.3 |
| Less than 20 microns | 87.3 |
| Less than 15 microns | 77.6 |
| Less than 10 microns | 66.2 |
| Less than 7.5 microns | 58.7 |

The calculated surface area of a typical mason's cement of our invention is 3520. Under similar conditions of grinding, it was found that the use of straight rosin gave a surface area of 3620 and of yellow hog fat grease alone gave a surface area of 3290.

The degree of fineness indicated by the foregoing table is very much finer than that of ordinary standard Portland cement. The table indicates that more than 50% by weight of the mason's cement of our invention will be made up of particles having a size less than 7.5 microns and less than 1% of particles having a size greater than 35 microns.

The resulting composition of our mason's cement can be used in the usual way for making up into a mortar, for use by bricklayers, plasterers and similar artisans. For this purpose, the cement is mixed with sand and water incorporated into the mass until the proper consistency has been obtained. The proportions of sand and water can be greater than those customary in the art using previously known mason's cements. As much as 4 to 7 parts by weight of sand to 1 part of our mason's cement can be used with satisfactory results, owing to the high degree of plasticity of our product. Previously, 4 to 1 was about highest average ratio of sand to cement by weight that was practical.

We attribute the improved sand carrying capacity of our cement to the use of our plasticizer. Observations show that when our cement is mixed into a mortar with sand and water, minute air bubbles are formed in immense numbers and that these air bubbles persist during the mixing and subsequent hardening of the mortar. When our plasticizer is omitted or used in percentages below about 0.3% by weight of the mixture, or when rosin or fat alone is used, there is no such extensive formation of air bubbles in the mortar mix and its sand and water carrying capacity is greatly reduced.

Because of the air bubble formation, mortar prepared from our cement has a much lower density after hardening and drying than previously known straight Portland cement mortars. For example, mortar using our cement, hardens and dries to give a mass having a density of from 105 to 115 lbs. per cu. ft. as compared with over 130 lbs. per cu. ft. for straight Portland cement mortars or concretes.

The mortar so formed from the mason's cement of our invention has greatly improved properties of plasticity and is easily and smoothly workable with the trowel. In using the mortar of this invention for the laying of bricks, we have found that the mortar "strings" well. By this is meant that the mortar may be strung out from the mason's trowel over a course of bricks as far as the mason can conveniently reach without breaking the continuity of the layer or string of mortar. The mortar does not set up too rapidly for convenient handling but works well. These properties are very important in a bricklayer's mortar and have not, to the best of our knowledge, been previously obtained in a mortar prepared from Portland cement materials.

The term "plasticity", as herein used, includes a number of properties variously referred to as water retentiveness, butteriness, fattiness, etc., and combines the qualities of water retentiveness, paste per unit volume, stiffening time, lubricating qualities and other qualities of like nature. A measure of plasticity is a measure of the desirability of the mortar from the mason's standpoint.

The ideal stiffening time would be several hours, that is, long enough so that the mortar could be mixed rapidly in large quantities and be permitted to stand during the day while being used as required. If the stiffening time were too long, however, it would lap over the period when the mortar should have obtained an appreciable strength, and this in some cases would not be desired.

The plasticity should be high enough so that the mason can handle the mortar with the maximum quantity of sand and still obtain a strong, water tight mortar. The plasticity of a mason's cement using as plasticizer rosin by itself is not high enough to do this, whereas if a mixture of rosin and yellow hog fat grease within the proportions above indicated is used, the plasticity of the resulting mortar is high enough for this purpose.

A test on a plasticimeter of mortar prepared from our mason's cement using one part of mason's cement to 4 parts of standard Ottawa sand by weight gives the following results, depending upon the composition of the plasticizer:

| Plasticizer: | Index number |
|---|---|
| Rosin alone | 66 |
| Yellow hog fat grease alone | 106 |
| 95% rosin and 5% yellow hog fat grease | 124 |

A test for the stiffening time of a mixture of my mason's cement and Ottawa sand, 1 to 3.45 mix by weight, as determined by a modified Vicat apparatus, shows the following:

| Plasticizer: | Stiffening time (min.) |
|---|---|
| Rosin alone | 11 |
| Yellow hog fat grease alone | 22 |
| 95% rosin and 5% yellow hog fat grease | 22 |

From the foregoing table it is apparent that the use of a mixture of rosin and yellow hog fat grease, such as a mixture containing 95% rosin and 5% yellow hog fat grease, gives a greatly increased plasticity over the use of either rosin alone or yellow hog fat grease alone and gives a similar stiffening time to that obtained by using yellow hog fat grease alone, but a considerably longer stiffening time than that obtained by using rosin alone. As previously stated, the percentage of yellow hog fat grease in the plasticizer may be increased materially, but the mixture of 95% rosin and 5% yellow hog fat grease costs materially less than a plasticizer made with, say 40% rosin and 60% yellow hog fat grease.

In addition to the foregoing properties, our cement has a surprisingly high early and 28 days' strength considering its high limestone content. Its 1 day strength approaches that of a 100% Portland cement mix, although our cement has only a 50% Portland cement content.

We are aware that numerous details of the process may be varied through a wide range without departing from the principles of this invention, and we, therefore, do not purpose limiting the patent granted hereon otherwise than necessitated by the prior art.

We claim as our invention:

1. A composition of cementitious materials of such fineness that at least 98% thereof will pass through a 325 mesh screen, comprising a mixture of burned argillaceous and calcareous substances, an inert unburned calcareous substance, a sufficient proportion of gypsum and anhydrite in approximately equal weights to give an $SO_3$ content of over 3.0% by weight based on the weight of burned argillaceous and calcareous substances, and a plasticizer in an amount over 0.3% by weight of said mixture.

2. A cement comprising a finely ground mixture containing less than 1% by weight of particles exceeding 35 microns in diameter and more than 50% of particles less than 7.5 microns in diameter, the mixture containing a major proportion of Portland cement clinkers, a sufficient proportion of gypsum and anhydrite each in substantial proportions to give an $SO_3$ content of over 3.0% by weight based on the weight of said Portland cement clinkers in the mixture, and a plasticizer.

3. A cement having high strength and good stiffening time adapting said cement for use as a mason's cement, comprising a mixture of cementitious materials of such fineness that at least 98% thereof will pass through a 325 mesh screen, said mixture containing burned argillaceous and calcareous substances, a sufficient proportion of gypsum and anhydrite in approximately equal proportions by weight to give an $SO_3$ content of over 3.0% by weight of said burned substances, a substantial proportion but not over 52% of an unburned calcareous substance, and a plasticizer in an amount over 0.3% of said mixture.

WALDO E. TYLER.
THOMAS B. DOUGLAS.
PAUL R. CHAMBERLAIN.
RUSS A. LOVELAND.